(12) United States Patent
Evanovich et al.

(10) Patent No.: US 7,252,759 B2
(45) Date of Patent: Aug. 7, 2007

(54) IN-TANK RETURN LINE FILTER ELEMENT AND HYDRAULIC RESERVOIR WITH SAME

(75) Inventors: Steven R. Evanovich, Pittsburgh, PA (US); Augustus O. Schroeder, Pittsburgh, PA (US); Norbert Friedrich Karl Sann, Riegelsberg (DE); Michael Otto Sakraschinsky, St. Ingert (DE); Christopher B. Bortnik, Warrendale, PA (US); Joseph Francis Ickes, Baden, PA (US)

(73) Assignee: Schroeder Industries, LLC, Leetsdale, PA (US)

( * ) Notice: Subject to any disclaimer, the term of this patent is extended or adjusted under 35 U.S.C. 154(b) by 217 days.

(21) Appl. No.: 10/889,352

(22) Filed: Jul. 12, 2004

(65) Prior Publication Data

US 2005/0029171 A1    Feb. 10, 2005

Related U.S. Application Data

(63) Continuation-in-part of application No. 10/410,875, filed on Apr. 10, 2003, now abandoned.

(51) Int. Cl.
*B01D 35/027* (2006.01)

(52) U.S. Cl. .................. 210/130; 210/172.6; 210/448; 210/454; 210/463

(58) Field of Classification Search ................ 210/130, 210/131, 167, 168, 172, 196, 430, 438, 446, 210/448, 449, 451–455, 459–463, 493.2, 210/167.01, 167.02, 172.6
See application file for complete search history.

(56) References Cited

U.S. PATENT DOCUMENTS

| | | | |
|---|---|---|---|
| 2,982,418 A | 5/1961 | Balley | |
| 3,002,870 A * | 10/1961 | Belgarde et al. | 156/70 |
| 3,993,561 A * | 11/1976 | Swearingen | 210/131 |
| 4,935,128 A * | 6/1990 | Hoeptner, III | 210/130 |
| 5,679,244 A | 10/1997 | Tettman et al. | |
| 5,906,221 A | 5/1999 | Mancell | |
| 6,116,454 A | 9/2000 | Henderson et al. | |
| 6,475,380 B1 | 11/2002 | Fangmann et al. | |
| 6,508,271 B2 | 1/2003 | Evanovich et al. | |
| 2001/0002007 A1* | 5/2001 | Zupan et al. | 210/448 |

* cited by examiner

*Primary Examiner*—Matthew O. Savage
(74) *Attorney, Agent, or Firm*—BLK Law Group; Blynn L. Shideler; Krisanne Shideler

(57) ABSTRACT

A top or bottom mounted, in-line, in-tank return line filter element is mounted in a hydraulic reservoir. The reservoir includes a holding tank, at least one outlet extending from and one return line extending to the reservoir, an in-tank return line within the reservoir and extending to one return line, and an in-tank return line filter element mounted within the in-tank return line. The in-tank return line filter element includes an end cap, a filter media and a by-pass valve coupled thereto. The end cap includes a central fluid opening, a mounting surface for the filter media, and a peripheral attaching mechanism for attaching the filter element to the in-tank return line to form a filter assembly. The mounting surface is positioned between the central opening and the attaching mechanism such that an in-line, in-tank filter element is provided.

7 Claims, 6 Drawing Sheets

IN-TANK RETURN LINE FILTER ELEMENT AND HYDRAULIC RESERVOIR WITH SAME

RELATED APPLICATION

The present application is a Continuation-in-Part of application Ser. No. 10/410,875 entitled "In-tank Return Line Filter Element and Hydraulic Reservoir with Same" filed Apr. 10, 2003, now abandoned, and which is incorporated herein by reference.

BACKGROUND OF THE INVENTION

1. Field of the Invention

The present invention relates to an in-tank return line filter element. Specifically, the present invention relates to an in-tank return line filter elements and hydraulic reservoirs that incorporate the respective filter elements.

2. Background Information

Hydraulic reservoirs are used to hold hydraulic fluid that can be utilized by hydraulic systems, such as used in heavy machinery, including cranes, backhoes, demolition shears, bulldozers, and the like. In hydraulic systems, it is important to keep the hydraulic fluid free of debris. Consequently, filter units or filter assemblies have been incorporated in the hydraulic systems to filter debris from the hydraulic fluid.

U.S. Pat. Nos. 6,116,454; 6,475,380 and 6,508,271 disclose hydraulic reservoir designs that incorporate specific filter assemblies therein (i.e. in-tank filter elements), and these patents are incorporated herein by reference. The filter elements can be on the outlet lines, as shown in the '454 patent or in the inlet lines as shown in the '380 and '271 patents. A filter element on the outlet or suction side of a hydraulic reservoir is generally a simple strainer. Placing the filter element in the inlet or return lines that extends to the reservoir, as shown in the '271 and '380 patents provides certain advantages relating to the energy required by filtration and returning of the fluid to the reservoir.

The large majority of in-tank filter elements for hydraulic reservoirs utilize a return line filter element of some kind. One known or common example is a forming a partition or separate box structure within the hydraulic reservoir and incorporating a top mounted, or drop-in, filter element therein. A similar known configuration is to have the filter element as part of a larger filter assembly which is "dropped" into the top of the container with the return lines connected directly to the head of the filter assembly. This filter element is also a top mounted structure. The term "top mounted" refers to access or mounting direction in that the filter element is accessed and replaced through the top of the reservoir, such as in the '271 patent. These prior art top mounted filter elements result in a large amount of components and design complexity in the filter assembly due to sealing requirements and the like that are necessary.

There is a need in the industry for a simple, efficient, in-tank, in-line filter element for a return line of a hydraulic reservoir.

SUMMARY OF THE INVENTION

The problems set out above are solved by the hydraulic reservoirs having one of several in-tank return line filter elements according to the present invention. The hydraulic reservoir according to the invention includes a holding tank for holding fluid, at least one outlet from the hydraulic reservoir, at least one return line to the hydraulic reservoir, an in-tank return line extending within the hydraulic reservoir and extending to one return line, and an in-tank return line filter element mounted within the in-tank return line. The in-tank return line filter element is formed of an end cap, a filter media coupled to the end cap and a by-pass valve coupled to the filter media. The end cap includes a central opening for fluid, a mounting surface for attaching the filter media, and an attaching mechanism at a peripheral edge of the end cap for attaching the filter element to the in-tank return line. The in-tank return line and the filter element form a filter assembly for the hydraulic reservoir. The mounting surface is positioned between the central opening and the attaching mechanism such that an in-line, in-tank, filter element is provided.

These and other advantages of the present invention will be clarified in the description of the preferred embodiment taken together with the attached figures wherein like reference numerals represent like elements throughout.

BRIEF DESCRIPTION OF THE DRAWINGS

FIG. 1d is a bottom plan view of the filter element of FIG. 1a;

DETAILED DESCRIPTION OF THE PREFERRED EMBODIMENT

Figure 1A:
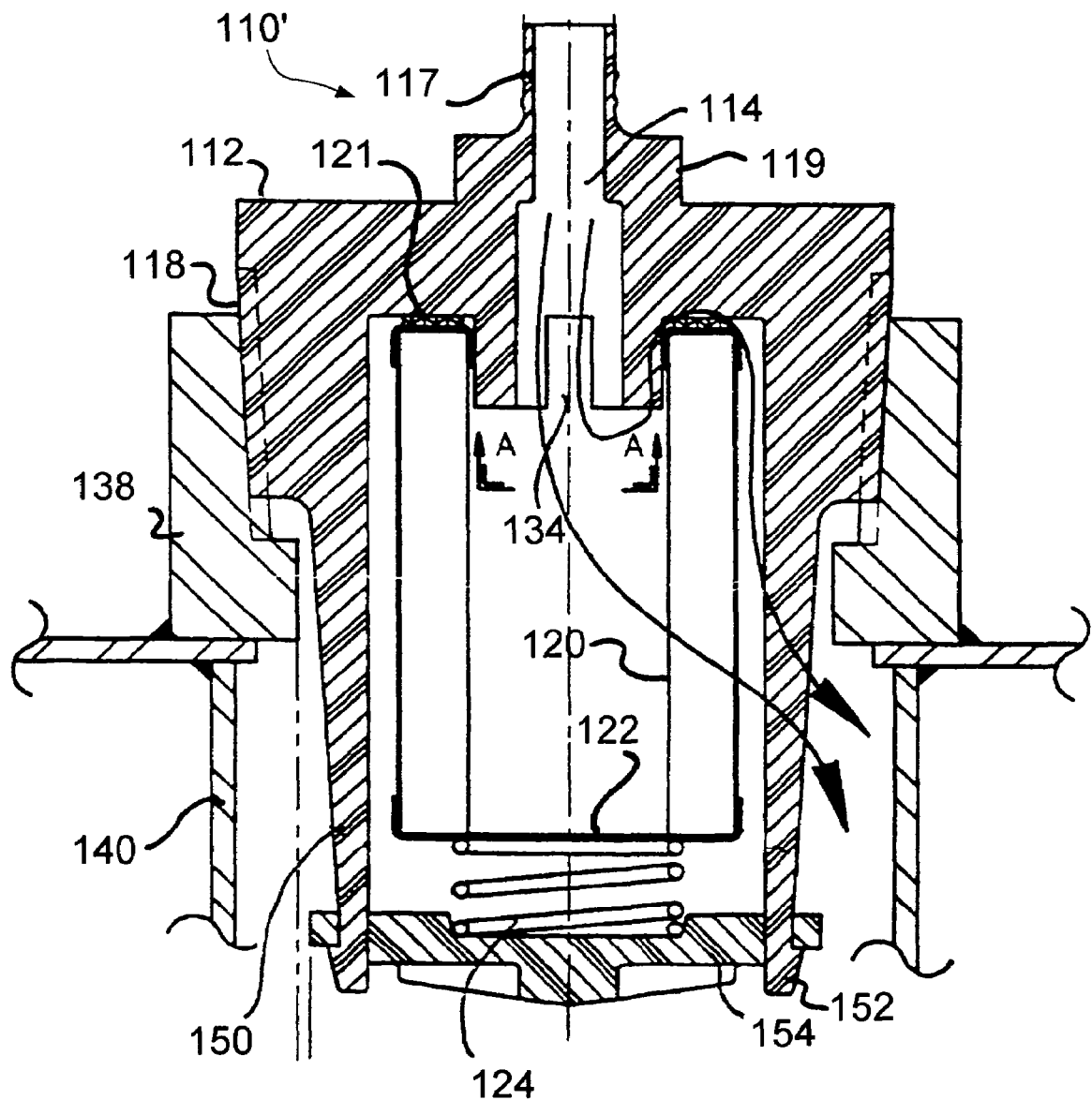
FIG. 1a is a sectional view of an in-tank return line for a hydraulic reservoir having a filter element according to a first embodiment of the present invention.
Figure 1B:
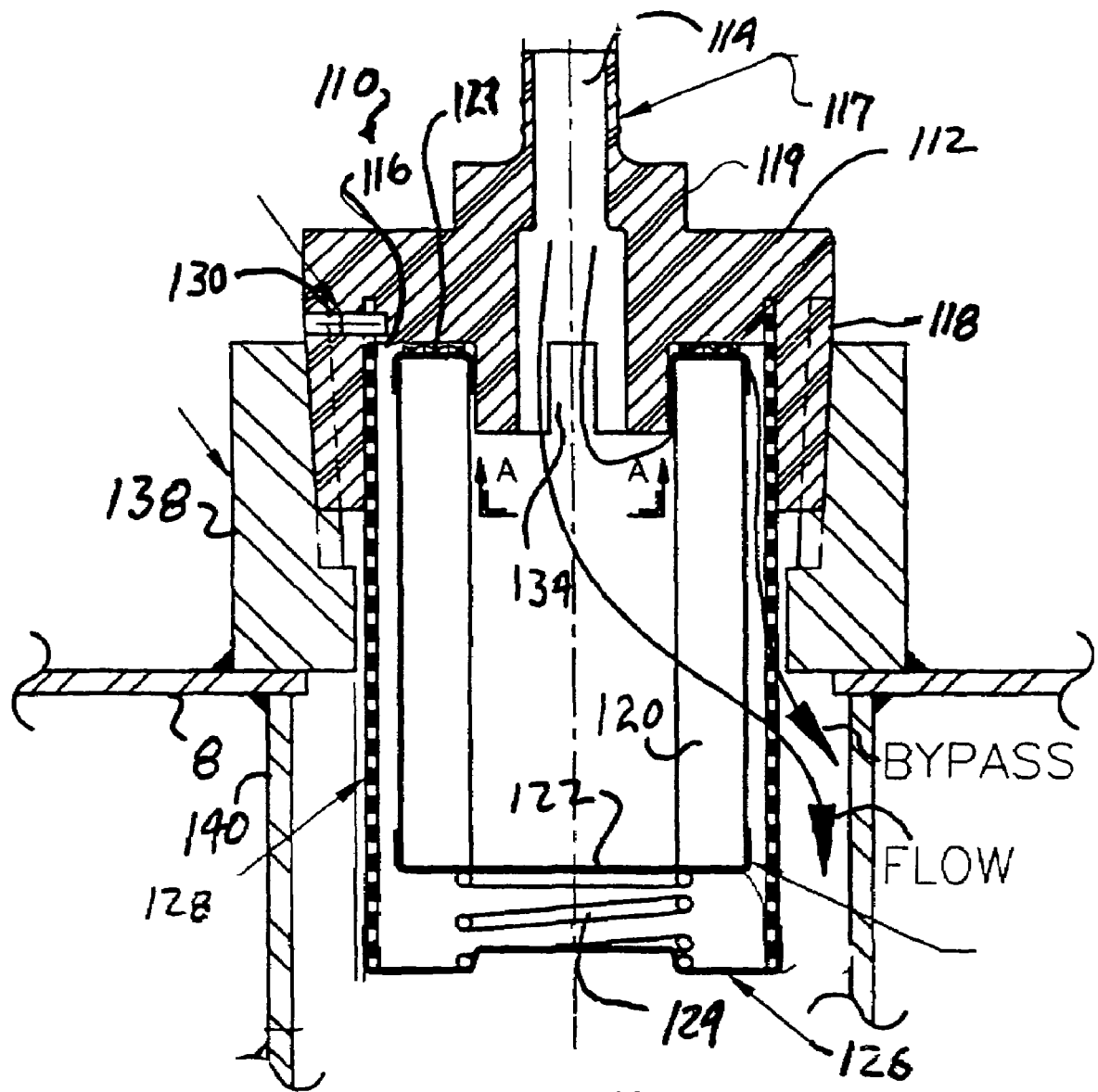
FIG. 1b is a sectional view of an in-tank return line for a hydraulic reservoir having a filter element according to a modified form of the first embodiment of the present invention.
Figure 1C:
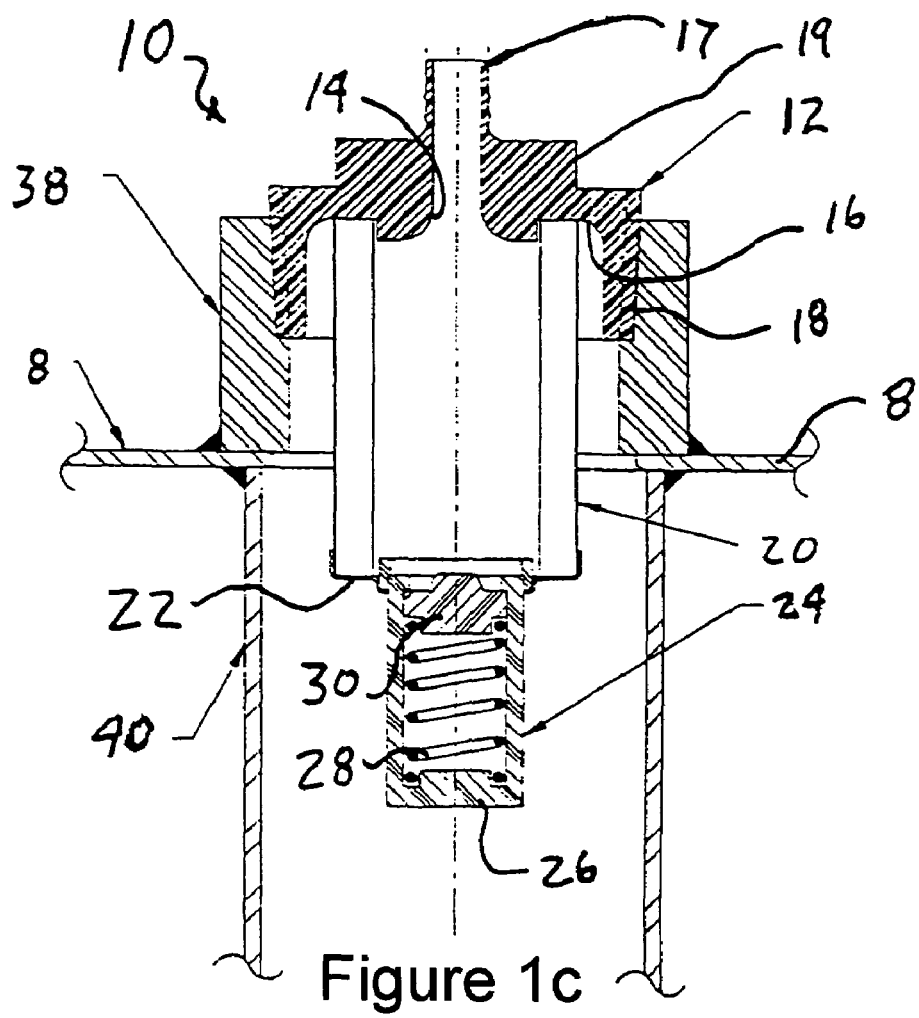
FIG. 1c is a sectional view of an in-tank return line for a hydraulic reservoir having a filter element according to a further embodiment of the present invention.

FIG. 1a illustrates a preferred embodiment of the present invention. FIGS. 1b and 1c illustrate modified embodiments of this invention. The scope and content of the present invention may best be elucidated by beginning with the "modified" form of figure 1c and following the evolution to the preferred embodiment. As discussed below, all of the specific embodiments are within the scope of the present claimed invention.

FIG. 1c is a schematic view of a hydraulic reservoir 8 (not shown completely) having an in-tank return line filter element 10 according to the present invention. The term "hydraulic reservoir" within the meaning of this application refers to a container for holding working fluid that is conveyed and returned to the reservoir in a circulating system or a holding container for a fuel. Generally, the working fluid is for hydraulic power or for lubrication such as petroleum and water-based fluids. The hydraulic reservoir 8 may be metal (e.g. steel) or plastic as known in the art. U.S. Pat. No. 6,508,271 discusses rotomolding of hydraulic reservoirs and is incorporated herein by reference. The hydraulic reservoirs 8 utilizing the present invention have one or more outlets for supplying hydraulic fluid contained in the reservoir to associated hydraulic systems as needed. Additionally the hydraulic reservoirs 8 include one or more return lines extending to hydraulic reservoir 8, generally in the upper portion of the hydraulic reservoir 8, for returning hydraulic fluid to the hydraulic reservoir. Within the meaning of this application a "return line" references that portion of the hydraulic circuit returning fluid to the hydraulic reservoir 8 that is exterior to the hydraulic reservoir 8 and the "in-tank return line" is that portion of the fluid circuit that is located within the hydraulic reservoir 8. The hydraulic reservoir 8 is vented to atmosphere.

FIG. 1c is a sectional view of an in-tank return line for a hydraulic reservoir 8 having a "top mounted" filter element 10 according to a first embodiment of the present invention. The term "top mounted" within the meaning of this specification means that the filter element 10 will be withdrawn (i.e. replaced) in a direction opposite of the flow of the in-tank return line and the filter element 10 will be attached to the return line by moving the filter element 10 along the direction of the flow in the in-tank return line. The top mounted designs effectively allows the filter element 10 to be replaced without a separate access into the reservoir 8 and avoids any need to drain the reservoir 8 during replacement of the filter element 10. The term "top mounted" is not intended to define a specific direction of the in-tank return line, which may extend from the top, bottom or side of the hydraulic reservoir 8. The details of the hydraulic reservoir 8 are known in the art and are not described herein in detail.

The top mounted, in-tank return line filter element 10 includes a plastic end cap 12 coupled to an in-tank return line as described here and after. Plastic saves manufacturing and shipping costs (due to weight), but other suitable materials can be used. The end cap 12 includes a central opening 14 for receiving the hydraulic fluid through the filter element 10 and into the hydraulic reservoir 8. The end cap 12 further includes a lower mounting surface 16, an upper connection or hose barb 17, attachment flats 19 and a peripheral threaded attachment surface 18. The attachment surface 18 can include other associated configuration to assist in the attachment of the filter element 10 to the in-tank return line.

A filter media 20 is bonded to the mounting surface 16 such as through an epoxy or other conventional attachment techniques. The filter media 20 includes a filtering structure and a support tube providing structural support (i.e. a backbone) to the filter media 20 as is known in the art.

A mounting flange 22 is attached to a distal end of the filter element 20 opposite the end cap 12. The mounting flange 22 allows for the attachment of a bypass valve assembly 24. The bypass valve assembly 24 includes an extended valve housing 26, a spring 28 and a valve body 30.

The end cap 12, a filter media 20, mounting flange 22 and bypass valve assembly 24 combined to form the top mounted, in-tank return line filter element 10 according to the present invention. The in-tank return line filter element 10 is positioned within an in-tank return line that extends into the hydraulic reservoir 8 to form a filter assembly.

In FIG. 1c the in-tank return line is formed by a half coupling 38 welded, or otherwise secured to the periphery of the reservoir 8 and a tubular in-tank return line enclosure portion 40 extending from the periphery of the hydraulic reservoir 8. The threaded attachment surface 18 is threaded to corresponding threads of the coupling 38. Although mounted on the exterior of the tank 8, the coupling 38 is essentially a mounting plate for the filter element 10 and is effectively part of the in-tank return line. Any other suitable fitting or other mechanical connection may be utilized in place of the threads. The return line is secured to the coupling 17 of the end cap 12 in a conventional fashion, such as a hose clamp. When extending from an upper portion of the hydraulic reservoir 8, the in-tank return line 40 may extend past the centerline of the reservoir 8 and preferably into a position well below the normal fluid level line within the hydraulic reservoir holding tank. This design will help avoid foaming within the fluid in the holding tank and will generally improve the fluid flow characteristics within the hydraulic reservoir 8.

In operation the hydraulic fluid is returned to the hydraulic reservoir 8 through the return line and into the in-tank return line formed by filter element 10, coupling 38 and first portion 40. It will be apparent from a review of FIG. 1 that the in-tank return line, specifically the coupling 38 and first portion 40, forms the housing for the filter element 10, whereby the filter element 10 and the in-tank return line form a filter assembly. The returning hydraulic fluid will, normally, flow though opening 14 then through the filter media 320 into the hydraulic reservoir holding tank. This forms an inside out filter element that uses the return line pressure for filtration. In other words no additional work or energy is needed for the filtration process, and there is no additional drag on the system.

The bypass valve assembly 24 operates in a conventional manner as an emergency bypass. The spring 28 is set to a by-pass pressure. If the filter media 20 is close to reaching its capacity (i.e. it is clogged), the pressure in the in-tank return line will increase until it reaches the by-pass pressure of the spring 28. At the by-pass pressure the spring 28 will be depressed by the valve body 30 allowing fluid to flow through openings (not shown) in the valve housing 26 to the reservoir interior. Activation of the by-pass valve assembly 24 by-passes the filter media 20, as known in the art. The in-line, in-tank return line positioning of the filter element 10 allows for a simple by-pass valve alarm to be utilized. The hydraulic reservoir 8 holding tank is vented to atmosphere and will therefore be at atmospheric pressure. A simple pressure sensor (not shown) can be connected to the in-tank return line to measure in-tank return line pressure. An alarm or other indication can be set at, or slightly below the by-pass pressure to give warning of the by-pass activation. In other words the alarm can indicate that immediate maintenance is required. The standard maintenance will be the replacement of the filter element 10.

The filter element 10 is designed for easy replacement and is top mounted relative to the in-tank return line. The replacement is exterior to the hydraulic reservoir 8. The operator will release the hose clamp to disengage the return line from the coupling 17 of the end cap 12 of the filter element 10. With the filter element 10 disengaged, the old filter element 10 can be removed and a new filter element 10 inserted. The new filter element 10 can be secured to the coupling 38 and the return line reattached to the coupling 17. The "top mounting" can be more precisely defined as a mounting that attaches to the in-tank return line with the direction of flow and is disengaged in the direction opposite of the flow.

The filter element 10 can be used with a variety of existing hydraulic reservoirs 8. All that is required is the presence of an in-tank return line sufficient for receiving the filter element 10 to form a filter assembly therein, and an appropriate mounting coupling 38 for attaching the filter element 10. It is anticipated that the first portion 40 and coupling 38 may also be retrofitted onto existing hydraulic tanks 8 to utilize the filter element 10.

FIG. 1b illustrates a filter element 110 similar to the filter element 10 discussed above. The in-tank return line is formed of coupling 138 and portion 140. The top mounted, in-tank return line filter element 110 includes a plastic end cap 112 coupled to the coupling 38. The end cap 112 includes a central opening 114 for receiving the hydraulic fluid through the filter element 110 and into the hydraulic reservoir 8. The end cap 112 further includes a lower mounting or sealing surface 116, an upper connection or hose barb 117, attachment flats 119 and a peripheral threaded attachment surface 118. The attachment surface 118 can include other configurations (e.g. press snap tight fit) to assist in the attachment of the filter element 110 to the in-tank return line.

A filter media 120 is spring biased against a gasket 121 that is bonded to the mounting surface 16. The filter media 120 includes a filtering structure and a support tube providing structural support (i.e. a backbone) to the filter media 120 as is known in the art. A mounting flange 122 is attached to a distal end of the filter element 120 opposite the end cap 112. The mounting flange 122 allows for the attachment of a bypass spring 124. The bypass spring 124 is mounted on base plate 126 that is secured to the end cap 112 though perforated tube 128. One or more pins 130 in the cap 112 can be used to securely attach the perforated tube to the cap 112.

The end cap 112, a filter media 120, mounting flange 122 and bypass spring 124, base plate 126 and perforated tube 128 combined to form the top mounted, in-tank return line filter element 110 according to the present invention. The in-tank return line filter element 110 is positioned within an in-tank return line that extends into the hydraulic reservoir 8 to form a filter assembly.

The bypass assembly is formed by the biased filter media 120 which operates as an emergency bypass. The spring 124 is set to a by-pass pressure. If the filter media 120 is close to reaching its capacity (i.e. it is clogged), the pressure in the in-tank return line will increase until it reaches the by-pass pressure of the spring 124. At the by-pass pressure the spring 124 will be depressed moving the filter media away from the sealing gasket 121 allowing fluid to flow through between the filter media 120 and the gasket 121 (and not through the media 120) to the reservoir interior. The in-line, in-tank return line positioning of the filter element 110 also allows for a simple by-pass valve alarm to be utilized. As shown in the figure, the central opening 14 may include slots 134 to increase flow into the filter assembly.

Figure 1D:
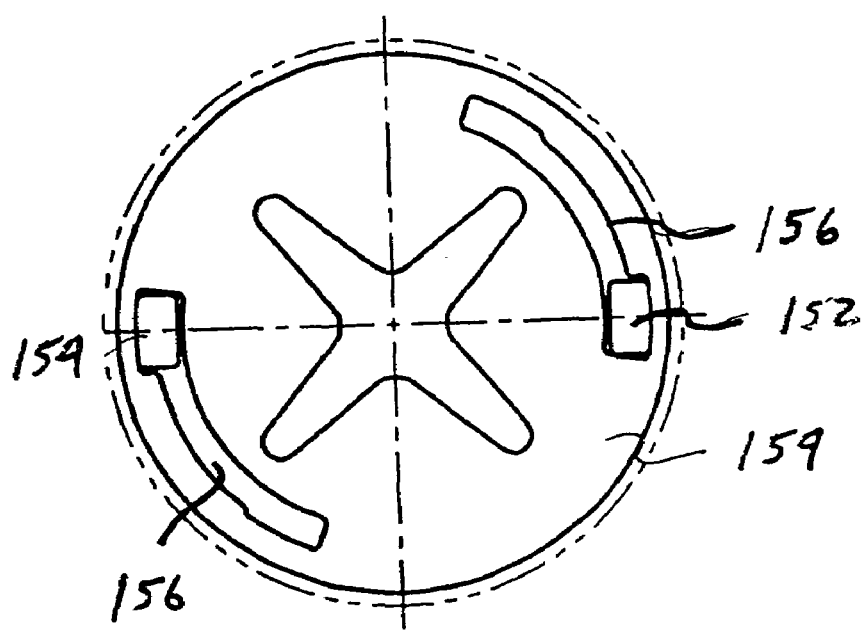

FIGS. 1a and 1d illustrate a filter element 110' according to a preferred embodiment of the present invention and is substantially similar to the filter element 110 discussed above. The only difference is that the perforated tube 128 and base plate 126 are replaced with plastic components. Specifically, tube 128 is replaced with plastic legs 150 that are formed integral with the end cap 112. The integral formation of the legs 150 eliminates the pins 130 and the associated assembly step for the filter element of figure 1c. The legs 150 include locking projections 152 which can be used to secure the legs 150 to a plastic retaining plate 154 (which replaces the base plate 126 of FIG. 1c). Locking slots 156 that receive the legs 150 and projections 152 there through are provided on the plate 154 as shown in FIG. 1d. One portion of the slot 156 is sized to receive the leg and the projection 152, with the remaining portion of the slot 156 being smaller than the projection as will be generally understood by those of ordinary skill in the art. The filter element 110' is intended to reduce the manufacturing costs and total components of the filter assembly.

Figure 2:
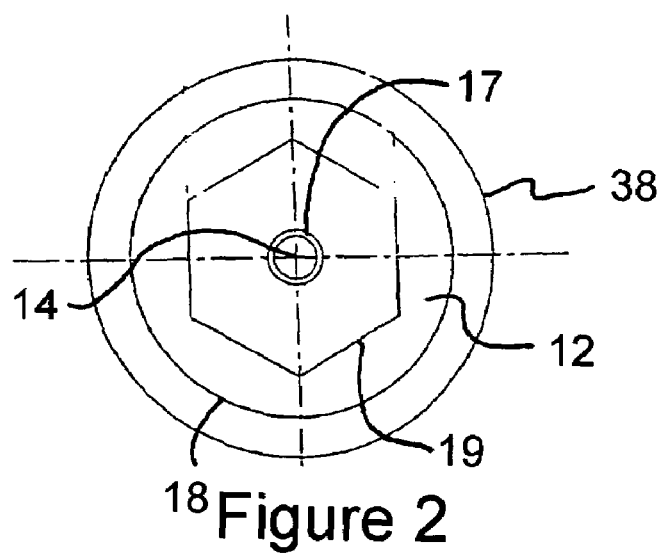
FIG. 2 is a top plan view of the in-tank return line of FIG. 1c.
Figure 3:
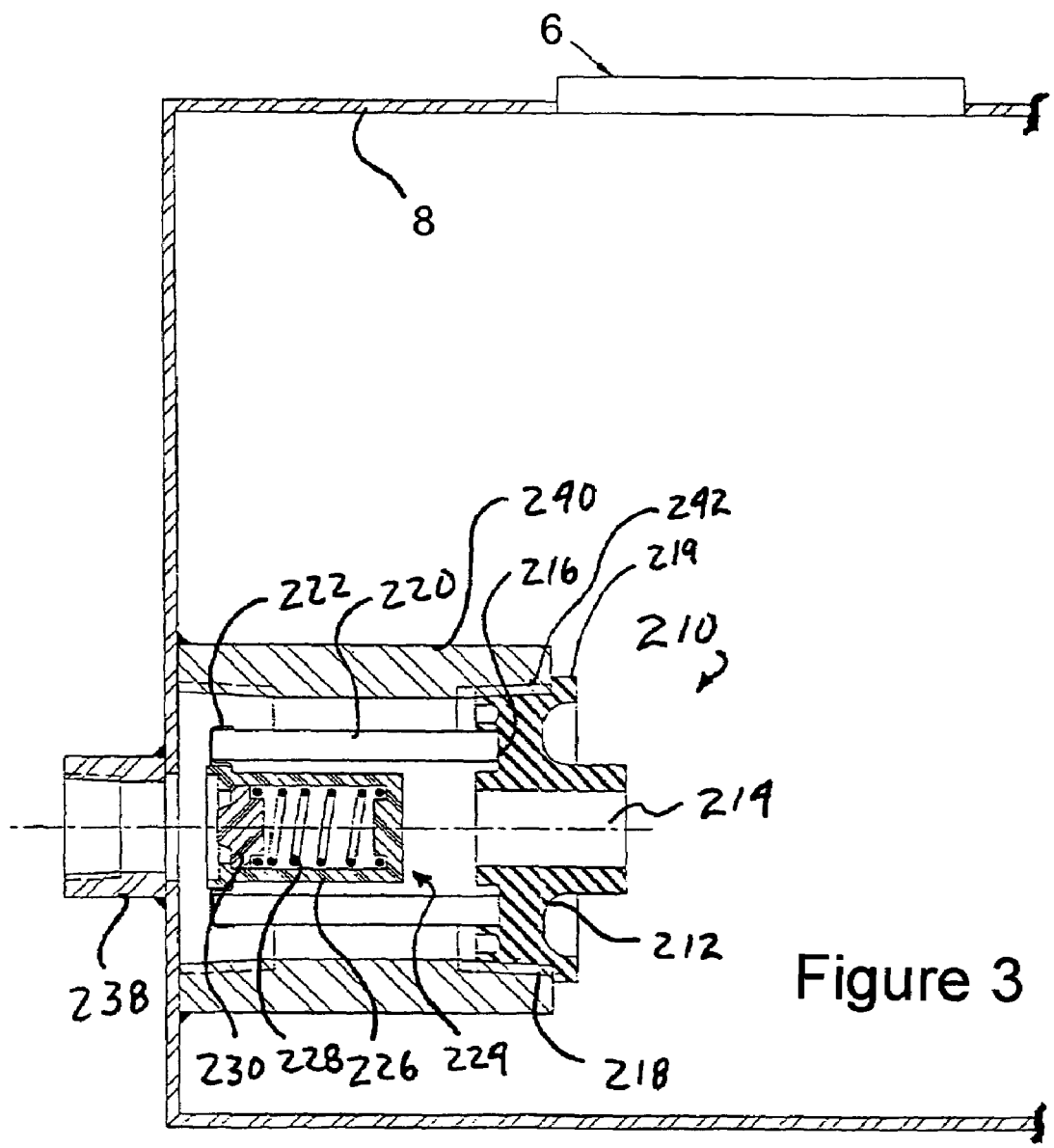
FIG. 3 is a sectional view of an in-tank return line for a hydraulic reservoir having a filter element according to a second embodiment of the present invention.

FIG. 3 is a sectional view of an in-tank return line for a hydraulic reservoir 8 having a filter element 210 according to a second embodiment of the present invention. Additionally, as will become apparent, the hydraulic reservoir 8 will need to have a man-way opening, or clean out access 6 for replacement of the bottom mounted filter element 210. The term "bottom mounted" within the meaning of this specification means that the filter element 210 will be withdrawn (i.e. replaced) in a direction of the flow of the in-tank return line and the filter element 210 will be attached to the return line by moving the filter element 210 along the direction opposite the flow in the in-tank return line. This is the opposite of the "top mounted" filter elements of FIGS. 1a-d and 2. As noted above, these terms are not intended to define a specific direction of the in-tank return line which may extend from the top, bottom or side of the hydraulic reservoir 8. The additional details of the hydraulic reservoir 8 are known in the art and are not described herein in detail.

The bottom mounted, in-tank return line filter element 210 includes an end cap 212 coupled to an in-tank return line as described here and after. The end cap 212 includes a central opening 214 for receiving the hydraulic fluid through the filter element 210 and into the hydraulic reservoir 8. The end cap 212 further includes an upper mounting surface 216 and a peripheral attachment surface 218. As with "top mounted", the terms "upper" and "lower" are not intended to define the orientation of the elements or the associated surfaces. The attachment surface 218 can include threads as shown in FIG. 3, or other associated configuration to assist in the attachment of the filter element 210 to the in-tank return line.

A filter media 220 is bonded to the mounting surface 216 such as through an epoxy or other conventional attachment techniques. The filter media 220, similar to filter media 20, includes a filtering structure and a support tube providing structural support (i.e. a backbone) to the filter media 220 as is known in the art.

A mounting flange 222 is attached to a distal end of the filter element 220 opposite the end cap 212. The mounting flange 222 allows for the attachment of a bypass valve assembly 224. The bypass valve assembly 224 includes an extended valve housing 226, a spring 228 and a valve body 230.

The end cap 212, a filter media 220, mounting flange 222 and bypass valve assembly 224 combined to form the bottom mounted, in-tank return line filter element 210 according to the present invention. The in-tank return line filter element 210 is positioned within an in-tank return line that extends into the hydraulic reservoir 8 to form a filter assembly.

In FIG. 3 the in-tank return line is formed by a first return line portion 240 extending from the return line at the periphery of the hydraulic reservoir 8. A coupling 220 may be provided for attachment of the external return line, with the coupling 38 being of any conventional fashion (i.e. it will match the specific return line). The first portion 240 includes threads 242 at a distal end thereof. As discussed above in connection with FIG. 1, when extending from an upper portion of the hydraulic reservoir 8, the in-tank return line may extend past the centerline of the reservoir 8 and preferably into a position well below the normal fluid level line within the hydraulic reservoir holding tank.

The bottom mounted filter element 210 is attached to the in-tank return line formed by portion 240 by a threaded connection between the end cap 212 and the portion 240, however, any other suitable compression fitting or other mechanical connection may be utilized.

In operation the hydraulic fluid is returned to the hydraulic reservoir 8 through the return line and into the in-tank return line formed by coupling 238 and first portion 340. The in-tank return line, specifically the portion 240, forms the housing for the filter element 210, whereby the filter element 210 and the in-tank return line form a filter assembly. The returning hydraulic fluid will, normally, flow though the filter media 220, and through the opening 214 into the hydraulic reservoir holding tank. This forms an outside-in filter element that uses the return line pressure for filtration, no additional work or energy is needed for the filtration process, and there is no additional drag on the system.

The bypass valve assembly 224 operates in a conventional manner as an emergency bypass, essentially as described above in connection with bypass valve 24. The spring 228 is set to a by-pass pressure. If the filter media 220 is close to reaching its capacity, the pressure in the in-tank return line will increase until it reaches the by-pass pressure of the spring 228. At the by-pass pressure the spring 228 will be depressed by the valve body 230 allowing fluid to flow through openings (not shown) in the valve housing 226 to the opening 214. Activation of the by-pass valve assembly 224 by-passes the filter media 220, as known in the art. The in-line, in-tank return line positioning of the filter element 210 allows for a simple by-pass valve alarm to be utilized. The hydraulic reservoir 8 holding tank is vented to atmosphere and will therefore be at atmospheric pressure. A simple pressure sensor (not shown) can be connected to the in-tank return line to measure in-tank return line pressure. An alarm or other indication can be set at, or slightly below the by-pass pressure to give warning of the by-pass activation. In other words the alarm can indicate that immediate maintenance is required. The standard maintenance will be the replacement of the filter element 210.

The filter element 210 is designed for easy replacement and is bottom mounted relative to the in-tank return line. The replacement is through the man-way or cleanout access 6 in the hydraulic reservoir 8. The operator will unthread the end cap 212 to disengage the filter assembly 210. With the filter element 210 disengaged, the old filter element 210 can be removed and a new filter element 210 inserted. The new filter element 210 can be secured by threading on end cap 212. The "bottom mounting" can be more precisely defined as a mounting that attaches to the in-tank return line opposite to the direction of flow and is disengaged in the direction of flow.

The filter element 210 can be used with a variety of existing hydraulic reservoirs 8. All that is required is the presence of an in-tank return line sufficient for receiving the filter element 210 to form a filter assembly therein, and an access port 6 for inserting and replacing the filter element 210. It is anticipated that the first portion 240 may also be retrofitted onto existing hydraulic tanks 8 to utilize the filter element 210.

Figure 4:
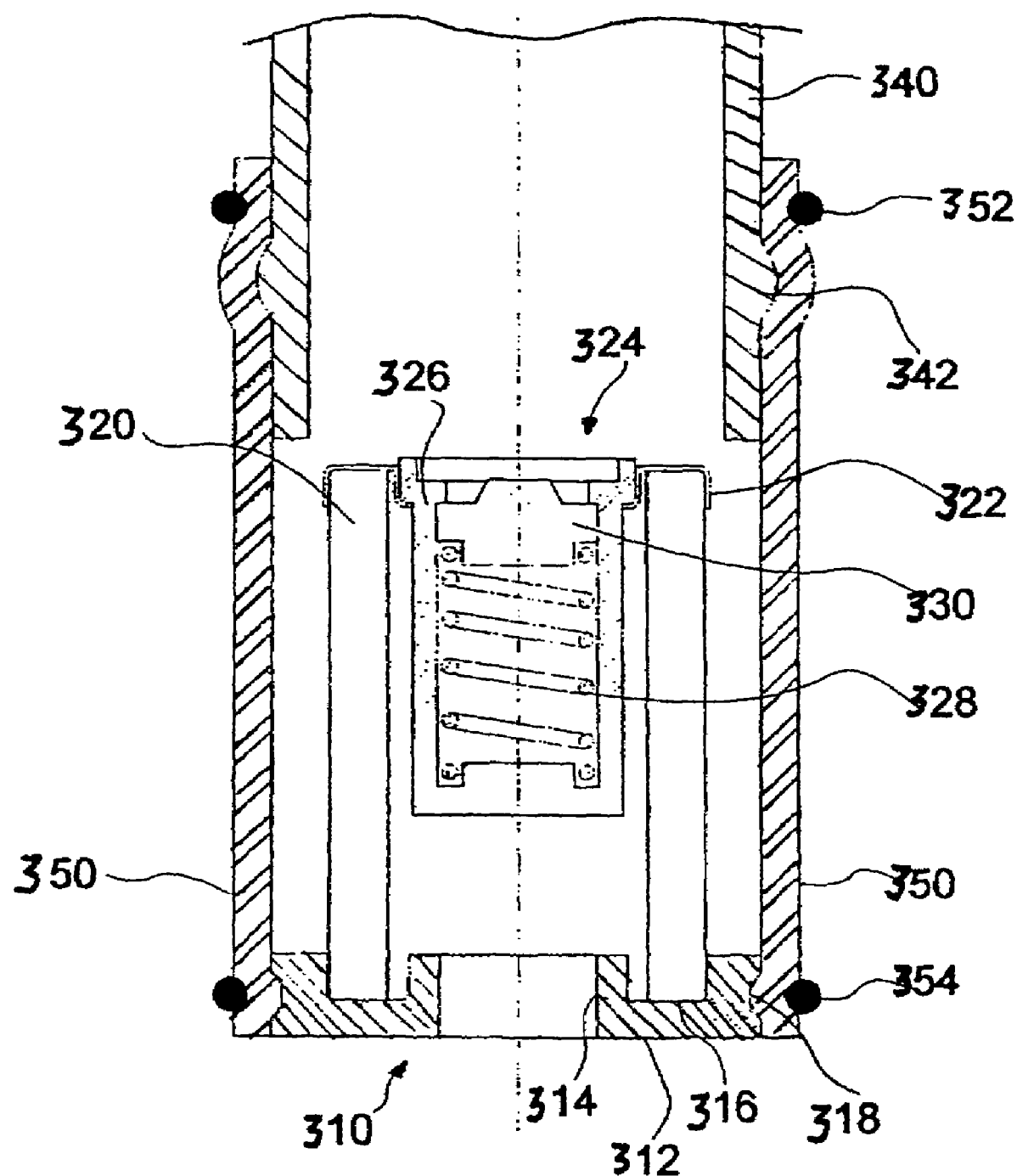
FIG. 4 is a sectional view of an in-tank return line for a hydraulic reservoir having a filter element according to a third embodiment of the present invention.
Figure 5:
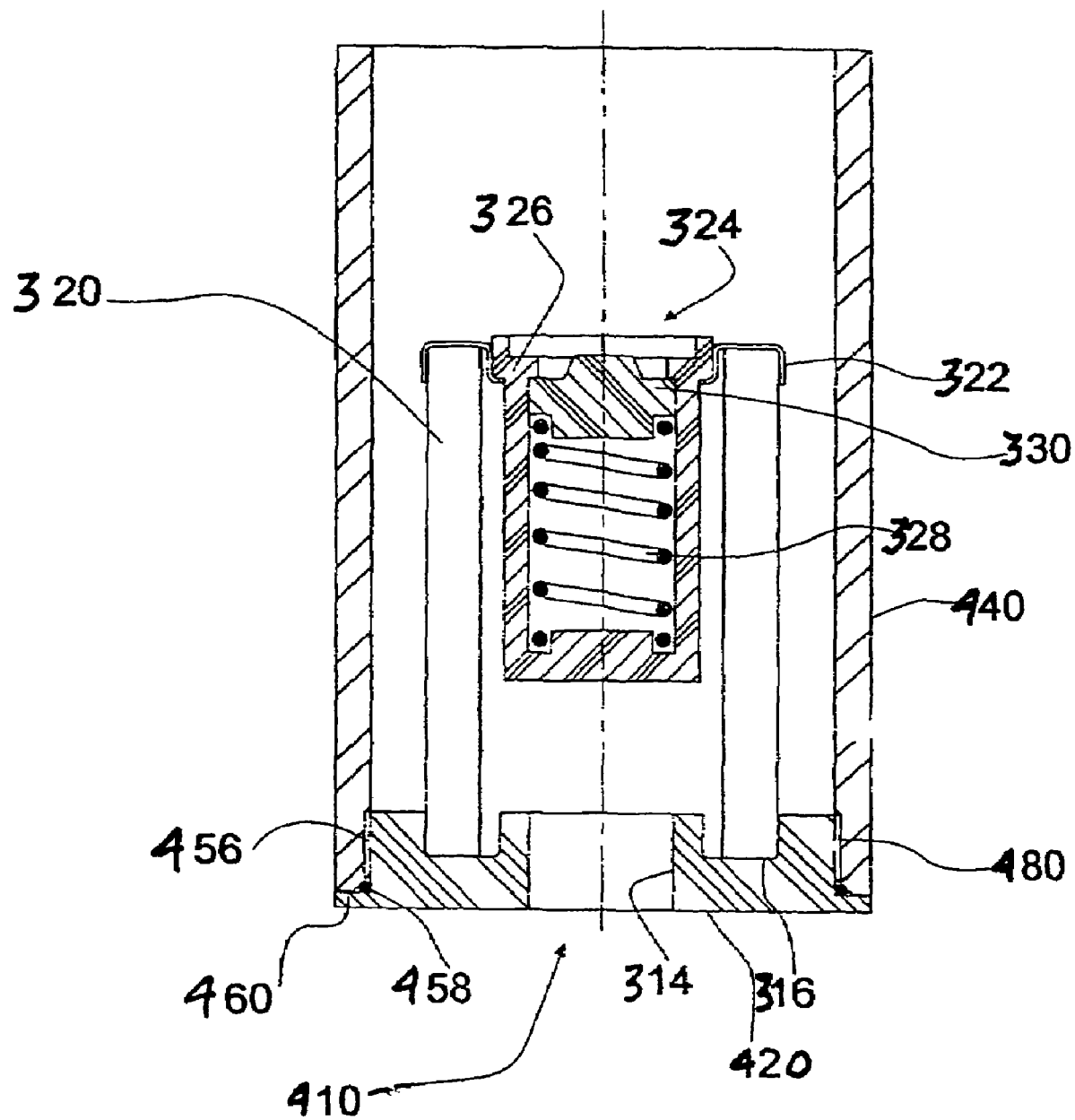
FIG. 5 is a sectional view of an in-tank return line for a hydraulic reservoir having a filter element according to a fourth embodiment of the present invention.

FIG. 4 is a sectional view of an in-tank return line for a hydraulic reservoir 8 having a filter element 310 according to a third embodiment of the present invention. Additionally, as will become apparent, the hydraulic reservoir 8 will need to have a man-way opening 6 (such as shown in FIG. 3), or clean out access for replacement of the bottom mounted filter element 310. The term "bottom mounted" within the meaning of this specification means that the filter element 310 will be withdrawn (i.e. replaced) in a direction of the flow of the in-tank return line and the filter element 310 will be attached to the return line by moving the filter element 310 along the direction opposite the flow in the in-tank return line. This is the opposite of the "top mounted" filter elements of FIGS. 1-2. These terms are not intended to define a specific direction of the in-tank return line which may extend from the top, bottom or side of the hydraulic reservoir 8. The details of the hydraulic reservoir 8 are known in the art and are not described herein in detail.

The bottom mounted, in-tank return line filter element 310 includes an end cap 312 coupled to an in-tank return line as described here and after. The end cap 312 includes a central opening 314 for receiving the hydraulic fluid through the filter element 310 and into the hydraulic reservoir 8. The end cap 312 further includes an upper mounting surface 316 and a peripheral attachment surface 318. The attachment surface 318 can include a groove as shown in FIG. 4, or an external bead, pair of spaced beads projected beads or other associated configuration to assist in the attachment of the filter element 310 to the in-tank return line.

A filter media 320 is bonded to the mounting surface 316 such as through an epoxy or other conventional attachment techniques. The filter media 320 includes a filtering structure and a support tube providing structural support (i.e. a backbone) to the filter media 320 as is known in the art.

A mounting flange 322 is attached to a distal end of the filter element 320 opposite the end cap 312. The mounting flange 322 allows for the attachment of a bypass valve assembly 324. The bypass valve assembly 324 includes an extended valve housing 326, a spring 328 and a valve body 330.

The end cap 312, a filter media 320, mounting flange 322 and bypass valve assembly 324 combined to form the bottom mounted, in-tank return line filter element 310 according to the present invention. The in-tank return line filter element 310 is positioned within an in-tank return line that extends into the hydraulic reservoir 8 to form a filter assembly.

In FIG. 4 the in-tank return line is formed by a first return line portion 340 extending from the return line at the periphery of the hydraulic reservoir 8. The first portion 340 includes an external barb 342 at a lower portion thereof. The in-tank return line of FIG. 4 includes a second portion formed by hydraulic hose 350. The hose 350 is coupled to the first portion 340 with a hose clamp 352 positioned above the external barb 342. Any other suitable compression fitting or other mechanical connection may be utilized in place of the hose clamp 352. When extending from an upper portion of the hydraulic reservoir 8, the in-tank return line may extend past the centerline of the reservoir 8 and preferably into a position well below the normal fluid level line within the hydraulic reservoir holding tank. This design will help avoid foaming within the fluid in the holding tank and will generally improve the fluid flow characteristics within the hydraulic reservoir 8.

The bottom mounted filter element 310 is attached to the in-tank return line by a hose clamp 354 securing the hose 350 to the attachment surface 318 of the end cap 312. The groove on the attachment surface 318 will assist in maintaining the filter element 310 in position. As with hose clamp 352, any other suitable compression fitting or other mechanical connection may be utilized in place of the hose clamp 354.

In operation the hydraulic fluid is returned to the hydraulic reservoir 8 through the return line and into the in-tank return line formed by first portion 340 and hose 350. It will be apparent from a review of FIG. 4 that the in-tank return line, specifically the hose 350, forms the housing for the filter element 310, whereby the filter element 310 and the in-tank return line form a filter assembly. The returning hydraulic fluid will, normally, flow though the filter media 320, and through the opening 314 into the hydraulic reservoir holding tank. This forms an outside-in filter element that uses the return line pressure for filtration. In other words no additional work or energy is needed for the filtration process, and there is no additional drag on the system.

The bypass valve assembly 324 operates in a conventional manner as an emergency bypass. The spring 328 is set to a by-pass pressure. If the filter media 320 is close to reaching its capacity (i.e. it is clogged), the pressure in the in-tank return line will increase until it reaches the by-pass pressure of the spring 328. At the by-pass pressure the spring 328 will be depressed by the valve body 330 allowing fluid to flow through openings (not shown) in the valve housing 326 to the opening 314. Activation of the by-pass valve assembly 324 by-passes the filter media 320, as known in the art. The in-line, in-tank return line positioning of the filter element 310 allows for a simple by-pass valve alarm to be utilized. The hydraulic reservoir 8 holding tank is vented to atmosphere and will therefore be at atmospheric pressure. A simple pressure sensor (not shown) can be connected to the in-tank return line to measure in-tank return line pressure. An alarm or other indication can be set at, or slightly below the by-pass pressure to give warning of the by-pass activation. In other words the alarm can indicate that immediate maintenance is required. The standard maintenance will be the replacement of the filter element 310.

The filter element 310 is designed for easy replacement and is bottom mounted relative to the in-tank return line. The replacement is through the man-way or cleanout access 6 in the hydraulic reservoir 8. The operator will release the hose clamp 354 to disengage the filter assembly 310. With the filter element 310 disengaged, the old filter element 310 can be removed and a new filter element 310 inserted. The new filter element 310 can be secured by reattaching the hose clamp 354. The "bottom mounting" can be more precisely defined as a mounting that attaches to the in-tank return line opposite to the direction of flow and is disengaged in the direction of flow.

The filter element 310 can be used with a variety of existing hydraulic reservoirs 8. All that is required is the presence of an in-tank return line sufficient for receiving the filter element 310 to form a filter assembly therein, and an access port 6 for inserting and replacing the filter element 310. It is anticipated that the first portion 340 and hose 350 may also be retrofitted onto existing hydraulic tanks 8 to utilize the filter element 310.

Various changes may be made to the filter element 310 as will be apparent to those in the art. For example the end cap 312 may be machined from metal with a sealing O-ring or may be injection molded to provide a thinner profile.

FIG. 2 illustrates a forth embodiment of the present invention which incorporates some changes. The bottom mounted, in-tank return line filter element 410 includes an end cap 420 coupled to an in-tank return line 440, that may be a steel tube. The end cap 420 includes a central opening 314 and an upper mounting surface 316 as discussed above. The end cap 420 includes a modified peripheral attachment surface 480 that includes threads 456 to assist in the attachment of the filter element 410 to the in-tank return line 440. An O-ring 458 and sealing gasket 460 on a shoulder of the end cap 420 are also provided for sealing the filter element 410.

A filter media 320 is bonded to the mounting surface 316 and a mounting flange 322 is attached to a distal end of the filter media 320 opposite the end cap 312, as described above in connection with filter element 310. A bypass valve assembly 324, which includes an extended valve housing 326, a spring 328 and a valve body 330, is attached to the mounting flange 322.

The end cap 420, a filter media 320, mounting flange 322 and bypass valve assembly 324 combined to form the in-tank return line filter element 410 according to the modified fourth embodiment of the present invention. The bottom mounted in-tank return line filter element 410 is positioned within an in-tank return line 440 that extends into the hydraulic reservoir 8. In FIG. 2 the in-tank return line 440 is formed by a single tube with threads at the end to engage with threads 456 of the end cap 420. The line 440 is in place of the first return line portion 340 and hydraulic hose 350 associated with filter element 310. The filter element 410 is threaded to the in-tank return line 440 by threads 456 of the attachment surface 480 of the end cap 420.

In operation the hydraulic fluid is returned to the hydraulic reservoir 8 through the return line and into the in-tank return line 440. The in-tank return line 440 forms the housing for the filter element 410 and combines therewith to form a filter assembly. The returning hydraulic fluid will, normally, flow though the filter element 320, and through the opening 314 into the hydraulic reservoir holding tank. This forms an outside-in filter element that uses the return line pressure for filtration. In other words no additional work or energy is needed for the filtration process, and there is no additional drag on the system. The bypass valve assembly 324 operates in a conventional manner as an emergency bypass, as described above. As with the filter element 310, a simple pressure sensor (not shown) can be connected to the in-tank return line 440 to measure in-tank return line pressure, whereby an alarm, or other indication, can be set at, or slightly below the by-pass pressure to give warning of the by-pass activation indicating that immediate maintenance (e.g. filter element 410 replacement) is required.

The bottom mounted filter element 410 is also designed for easy replacement. The replacement is through the man-way or cleanout access in the hydraulic reservoir. The operator will unthread the filter element 410 to disengage the filter element 410. External flats may be provided on the attachment surface 480, internal flats (i.e. an Allen head structure) may be provided on the opening 314, or other rotation assisting mechanism may be added to assist in the rotation of the filter element 410. The old filter element 410 can be removed and a new filter element 410 inserted. The new filter element 410 can be secured by threading the end cap 420 to the return line 440. The filter element 410 can also be used with a variety of existing hydraulic reservoirs 8. All that is required is the presence of an in-tank return line 440 sufficient for receiving the filter element 410, and an access port 6 for inserting and removing the filter element 410.

It is anticipated that the return line 440 may also be retrofitted onto hydraulic reservoirs 8 to utilize the filter element 410. The retrofitting may simply be by a peripheral plate surrounding the in-tank return line 440 that is attached by bolts or the like to the hydraulic reservoir 8. Appropriate sealing (e.g. gasket and or 0-ring) of the plate would be required. This modification may make the replacement of the filter element 410 easier in that the entire in-tank return line 440 can be removed from the reservoir to access and replace the filter element 410. The filter element 410 is still a "bottom mounted" structure, it is only the method of accessing the filter element 410 that may be different with this modification.

The other advantage of the present invention will be apparent to those in the art. The invention has been described with reference to the preferred embodiment. Obvious modifications and alterations will occur to others upon reading and understanding the proceeding detailed description. It is intended that the invention be construed as including all such modifications and alterations. The scope of the present invention is defined by the appended claims and equivalents thereto.

What is claimed is:

1. A hydraulic reservoir comprising:
a holding tank for holding fluid;
at least one outlet from the hydraulic reservoir;
at least one return line to the hydraulic reservoir; an in-tank return line extending within the hydraulic reservoir and extending to one said return line; and
an in-tank return line filter element mounted within said in-tank return line, said in-tank return line filter element comprising an end cap, a filter media coupled to the end cap and a by-pass valve coupled to the filter media, wherein the end cap includes a central opening for fluid, a mounting surface for attaching said filter media to the end cap, and an attaching mechanism at a radial outer peripheral edge of the end cap for attaching the filter element to said in-tank return line, and wherein said attaching mechanism of said in-tank return line filter element includes threads engaging threads on said in-tank return line.

2. The hydraulic reservoir of claim 1 wherein said in-tank return line filter element is a top mounted element.

3. A hydraulic reservoir comprising:
a holding tank for holding fluid;
at least one outlet from the hydraulic reservoir;
at least one return line to the hydraulic reservoir;
an in-tank return line extending within the hydraulic reservoir connected to one said return line, wherein said in-tank return line includes a coupling at one end thereof; and
an in-tank return line filter element mounted within said in-tank return line, said in-tank return line filter element comprising an end cap, a filter media coupled to the end cap and a by-pass valve coupled to the filter media, wherein the end cap includes a central opening for fluid, a mounting surface for attaching said filter media to the end cap, and an attaching mechanism at a radial outer peripheral edge of the end cap for attaching the filter element to said in-tank return line, wherein said attaching mechanism of said filter element includes threads engaging threads on said coupling, and wherein said filter element extends into the in-tank return line.

4. The hydraulic reservoir of claim 3 wherein the end cap includes a hose barb for attachment to the return line.

5. The hydraulic reservoir of claim 4 wherein the end cap is plastic.

6. A hydraulic reservoir comprising:
a holding tank for holding fluid;
at least one outlet from the hydraulic reservoir;
at least one return line to the hydraulic reservoir;
an in-tank return line extending within the hydraulic reservoir coupled to said return line and one end which defines an opening, wherein said opening of the in-tank return line has an inner diameter; and
an in-tank return line filter element mounted within said in-tank return line and extending at least partially therein, said in-tank return line filter element comprising an end cap, filter media coupled to the end cap, and a by-pass valve coupled to the filter media, wherein at least a portion of the filter element is concentrically positioned within the in-tank return line whereby an annular area formed between and bounded by the filter element and the inner wall of the in-tank return line forms part of the flow path through the in-tank return line filter element, wherein the inner diameter of said opening of said in-tank return line is larger than an outer diameter of said filter media and wherein the end cap includes a central opening for fluid, a mounting surface for attaching said filter media to the end cap, and an attaching mechanism at an outer peripheral edge of the end cap for attaching the filter element to said in-tank return line.

7. The hydraulic reservoir of claim 6 wherein said attaching mechanism of said in-tank return line filter element includes threads engaging threads on said in-tank return line.

* * * * *